US012662044B2

(12) United States Patent
Chen et al.

(10) Patent No.: US 12,662,044 B2
(45) Date of Patent: Jun. 23, 2026

(54) ROD FOR GOODS

(71) Applicant: Ningbo Xuli Metal Products Co., Ltd., Ningbo (CN)

(72) Inventors: Weiguo Chen, Ningbo (CN); Yanqiong Chen, Ningbo (CN); Kefeng Jin, Ningbo (CN); Wei Deng, Ningbo (CN)

(73) Assignee: Ningbo Xuli Metal Products Co. Ltd., Ningbo (CN)

( * ) Notice: Subject to any disclaimer, the term of this patent is extended or adjusted under 35 U.S.C. 154(b) by 393 days.

(21) Appl. No.: 18/490,454

(22) Filed: Oct. 19, 2023

(65) Prior Publication Data

US 2025/0065800 A1 Feb. 27, 2025

(30) Foreign Application Priority Data

Aug. 21, 2023 (CN) .......................... 202311058136.3

(51) Int. Cl.
B60P 7/15 (2006.01)
B63B 25/24 (2006.01)
(52) U.S. Cl.
CPC ................ B60P 7/15 (2013.01); B63B 25/24 (2013.01)
(58) Field of Classification Search
CPC ...... B60P 7/15; B66F 1/04; B66F 1/06; B66F 3/02; F16B 7/10; F16B 2/12; B63B 25/24
See application file for complete search history.

(56) References Cited

U.S. PATENT DOCUMENTS

| | | | | |
|---|---|---|---|---|
| 1,936,596 A | * | 11/1933 | Goebert | B66F 3/02 |
| | | | | 254/95 |
| 5,094,576 A | * | 3/1992 | Fredelius | F16B 7/10 |
| | | | | 410/151 |
| 9,481,286 B1 | * | 11/2016 | Xiao | B60P 7/15 |
| 2012/0104192 A1 | * | 5/2012 | Huang | B60P 7/15 |
| | | | | 248/125.2 |

FOREIGN PATENT DOCUMENTS

JP 3165875 U * 2/2011

* cited by examiner

*Primary Examiner* — Daniel J Colilla
(74) *Attorney, Agent, or Firm* — Wang Law Firm, Inc.

(57) ABSTRACT

An extensible rod with locking handle for goods comprises an inner tube, an outer tube, a rack, a hollow seat, an operating assembly and a lock catch assembly. The rack is disposed on the inner tube inside the outer tube, the operating assembly comprising a rotatable handle and a gear with a plurality of teeth connected to the handle is used for adjusting extension length of the inner tube, the teeth on the gear pass through the outer tube to engage with the rack on the inner tube, so that the handle and the gear are capable of driving the inner tube to extend out from or retract into the outer tube, the lock catch assembly is capable of locking or unlocking the handle. Under this design, the stability is high, and it is difficult to damage. Meanwhile, the defects of the existing extensible rod with locking handle for goods are effectively solved.

9 Claims, 11 Drawing Sheets

ROD FOR GOODS

TECHNICAL FIELD OF THE INVENTION

The present invention relates to an extensible rod with locking handle for goods used in trucks, vans, airplanes, ships and other vehicles to stop or fix goods to prevent the goods from moving.

BACKGROUND OF THE INVENTION

In the logistics industry or civil goods transportation process, to prevent goods from moving, the goods are often bound and fixed with ropes or binding belts. However, in some scenarios where it is inconvenient or unnecessary to bind goods with ropes or binding belts, for example, in containers, vans, pickup trucks and even passenger vehicles, an extensible rod with locking handle for goods has been invented to stop and fix goods or enhance stopping effect by binding, thereby further limiting the movement of goods and increasing the transportation safety.

Generally, the extensible rod with locking handle for goods is an extensible long rod having two ends, and its two ends are resisted against two inner sidewalls of a carriage or a ceiling and a deck inside the carriage. The extensible rod with locking handle for goods has an outer fixation tube and an inner extensible tube. An external cast steel rack having two ends is connected to the inner extensible tube, a toothed cast steel handle is mounted on the outer fixation tube, and the teeth on the handle can mesh with the rack. By pulling the handle, the inner tube can be pushed out to contact with the sidewall of the carriage and be braced tightly, thereby stopping the goods. Under this design, one end of the rack is fixed to the inner tube, while the other end thereof is not fixed and is cantilevered and higher than a side of the outer tube. The rack under this design has poor mobility, so that the rod for goods is large, heavy and inconvenient to operate. Moreover, the toothed handle and the rack are made of cast steel, so the production process is high in cost and detrimental to environmental protection. In addition, for the conventional extensible rod with locking handle for goods, since a lock catch and the button are arranged on a side face of the rod, the stress is unilateral, thus affecting the strength, easily touching by mistake and affecting the locking reliability.

Therefore, it is necessary to improve the existing conventional extensible rod with locking handle for goods.

SUMMARY OF THE INVENTION

It is an object of the present invention to provide a rod for goods which is reasonable in structure, so that the stability and reliability of the rod for goods can be improved and the rod for goods can have a smaller size, a lighter weight and a lower cost.

For achieving the above object, the extensible rod with locking handle for goods comprises
    an outer tube having a first end and a second end;
    an inner tube having a first end and a second end, the second end of the inner tube located inside the first end of the outer tube and the inner tube being telescopically connected to the outer tube;
    a rack disposed on the inner tube inside the outer tube;
    a hollow seat disposed on the first end of outer tube; an operating assembly disposed on the seat for adjusting extension length of the inner tube; and
    a lock catch assembly;

wherein, the operating assembly comprises a rotatable handle and a gear with a plurality of teeth connected to the handle, the first end of the outer tube has an opening on a top surface of the outer tube, the teeth pass through the opening to engage with the rack on the inner tube, so that the handle and the gear are capable of driving the inner tube to extend out from or retract into the outer tube; the lock catch assembly is capable of locking or unlocking the handle, and when the lock catch assembly locks the handle, the gear is engaged with the rack.

According to the application scenarios and practical purposes of the product of the present invention, it is not necessary the standard involute teeth profile should be applied for the gear and the rack here. Therefore, preferably, both the rack and the gear can be stamped parts, wherein the rack is a long strip-shaped stamped part, and the rack has a plurality of holes distributed at regular intervals along a length of the rack to engage with the plurality of teeth; the gear may be integral or spliced, preferably spliced to facilitate stamping, the gear is composed of a plurality of gear pieces, and each gear piece is a stamped part with the plurality of teeth stamped on a head of each gear piece. Such design is convenient for the manufacturing of the rack and the gear without affecting the meshing transmission effect therebetween.

Preferably, the lock catch assembly comprises a lock catch located inside the hollow seat, a lock pin mounted on the handle capable of locking or unlocking the lock catch, and an elastic member; the lock catch is pivoted to the hollow seat through a first pivot member; when the lock pin locks the lock catch, the handle is in a locked state and is unable to rotate, when the lock pin unlocks the lock catch, the handle is in an unlocked state and is able to rotate; the elastic member urges the lock catch towards the locked state and positions the lock catch inside the hollow seat. The lock catch is centered in the hollow seat, therefore the stress direction of the lock catch can be in the same plane as the center of the extensible rod with locking handle, so that the stress is uniform and the strength is improved. Moreover, the handle and the hollow seat are arranged on two sides of the lock catch for protection, so it is difficult to cause damage or touch by mistake.

Preferably, the inner tube has a mounting plane for mounting the rack, the rack has two ends which are connected to the mounting plane. The outer tube and the inner tube may be a circular tube, a rectangular tube, a square tube or an irregular-shaped tube, but it is preferable that the outer tube is a circular tube, the inner tube is a D-shaped tube forming the mounting plane for the rack.

Preferably, the hollow seat has a base portion with a C-shaped cross section for receiving the outer tube, and two sidewall portions extending upward from two top edges of the base portion, the base portion is sleeved outside the outer tube, the two sidewall portions is defined as an accommodating space for the handle, the gear and the lock catch, the handle is connected to the two sidewall portions through a second pivot member.

Preferably, the hollow seat is connected to the first end of the outer tube through a limiting piece inserted through the hollow seat and the outer tube; and the first end of the outer tube has a lacking hole for receiving the limiting piece on the periphery of the outer tube, correspondingly, the hollow seat has two inserting holes for receiving two ends of the limiting piece.

Preferably, to improve the stability, two ends of the rack are mounted on the mounting plane of the inner tube through a first fastener and a second fastener, respectively, and the head of the second fastener is higher than a surface of the rack so as to resist against the limiting piece; the second fastener and the limiting piece together form a limiting mechanism between the outer tube and the inner tube, so as to prevent the second end of the inner tube from being pulled out of the first end of the outer tube.

Preferably, the handle has a front end and a rear end, the front end of the handle has two opposite lateral pieces distributed at regular intervals, the gear is centrally arranged between the two lateral pieces.

Compared with the prior art, the extensible rod with locking handle for goods of the present invention has the following advantages. As the rack is fixed on the inner tube, two ends of the rack are connected to the inner tube and the outer tube is sleeved outside the inner tube, the stability of the rack is high, and it is difficult to damage when in use. Meanwhile, the defects of poor stability, poor mobility, easy damage or the like of the existing extensible rod with locking handle for goods because of the externally arranged rack with one cantilevered end are effectively solved. Moreover, by using the stamped rack and the stamped gear, the structure is simple, it is easy to manufacture, and the cost is low. In addition, by centering the lock catch in the hollow seat, the stress is centered, the strength is high and it is difficult to cause damage and touch by mistake, so that the overall safety of the extensible rod with locking handle for goods can be greatly improved.

Figure 1:
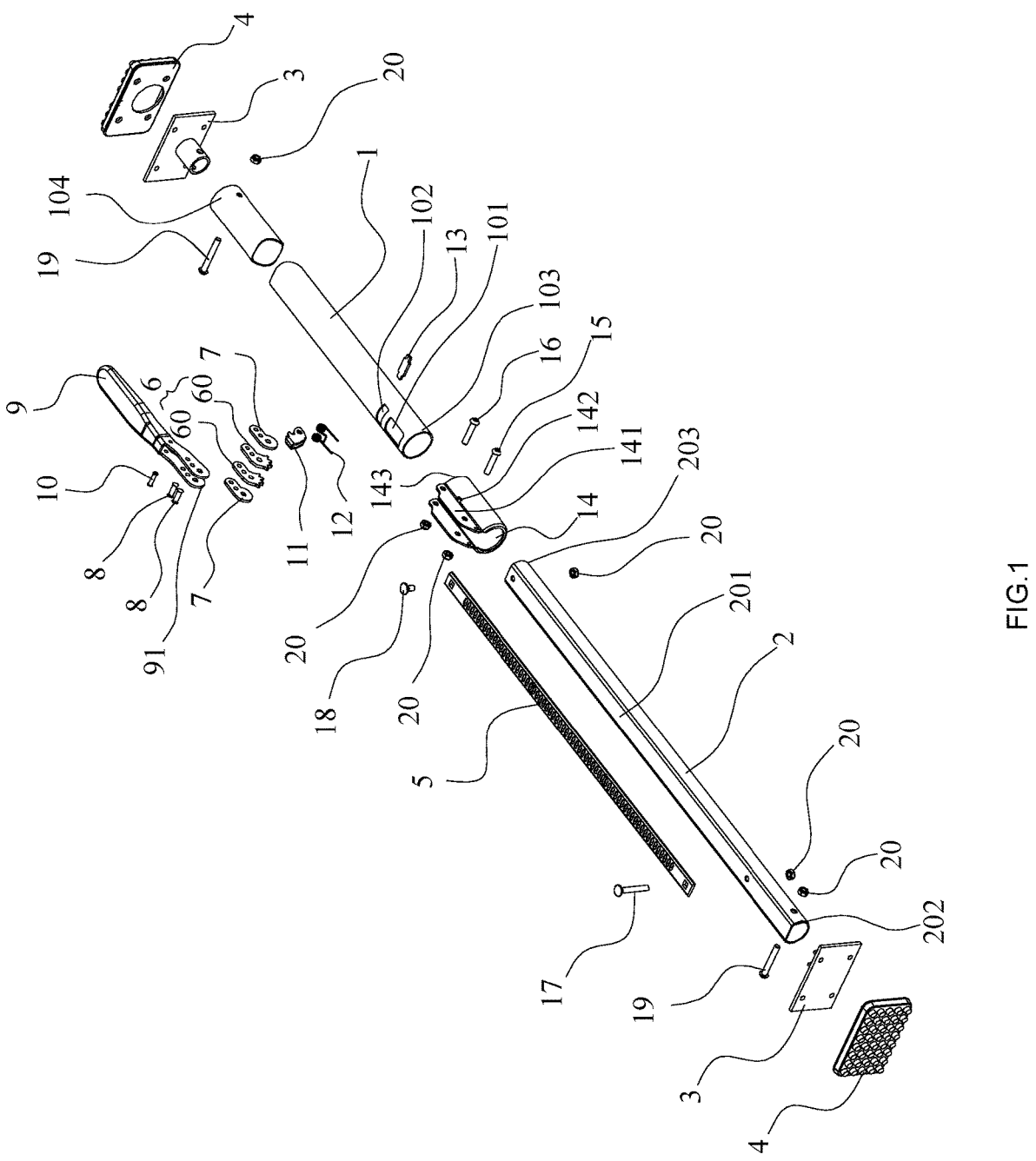
FIG. 1 is an exploded view of an extensible rod with locking handle for goods according to an embodiment of the present invention.
Figure 2:
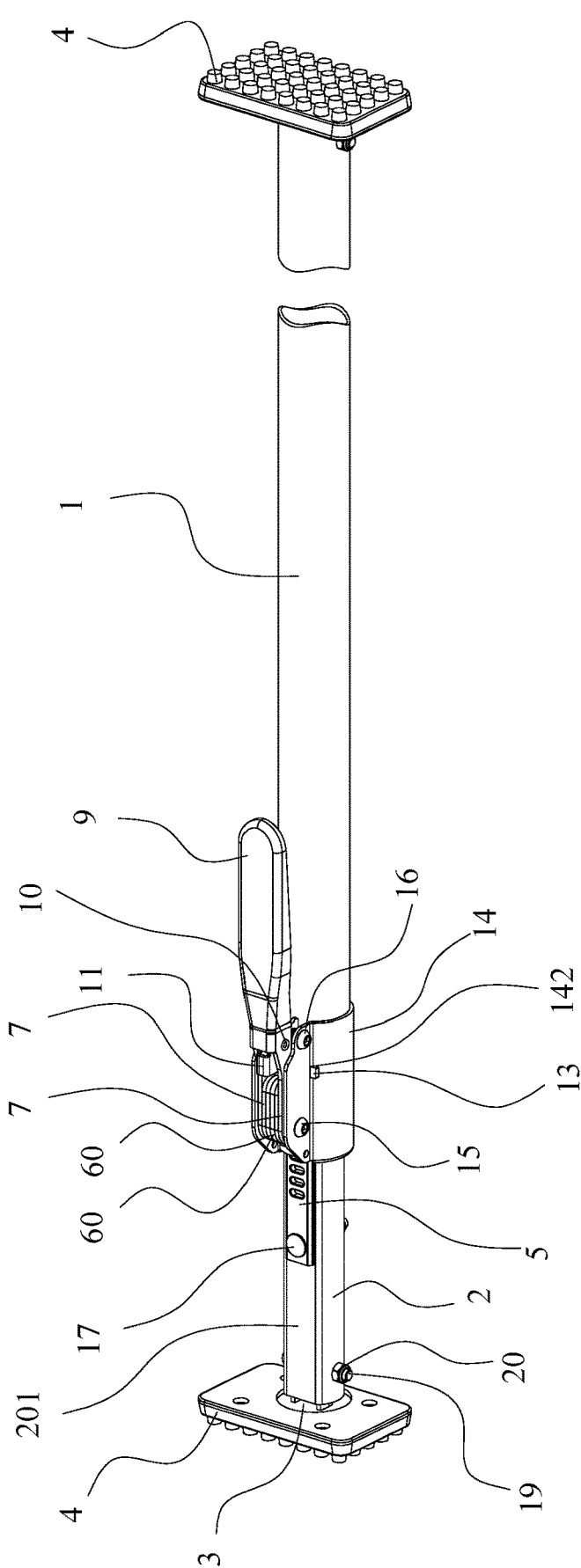
FIG. 2 is a perspective view of the extensible rod according to the embodiment of the present invention.
Figure 3:
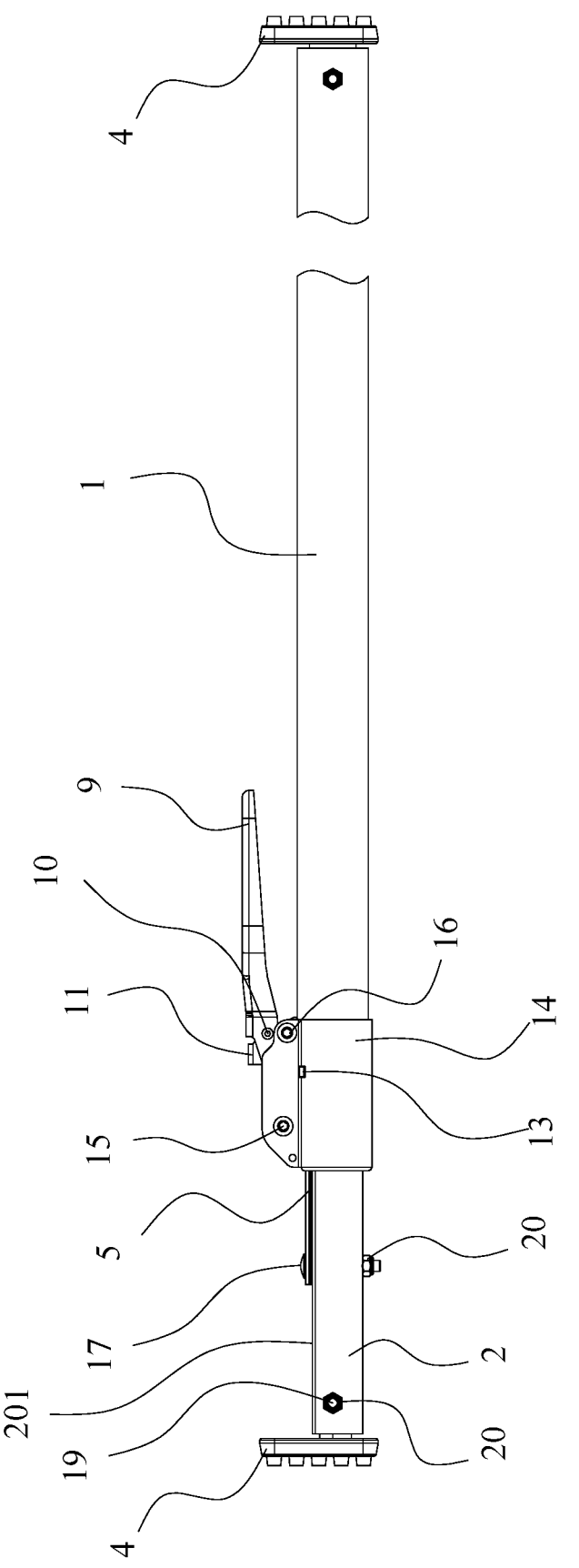
FIG. 3 is a front view of the extensible rod according to the embodiment of the present invention.
Figure 4:
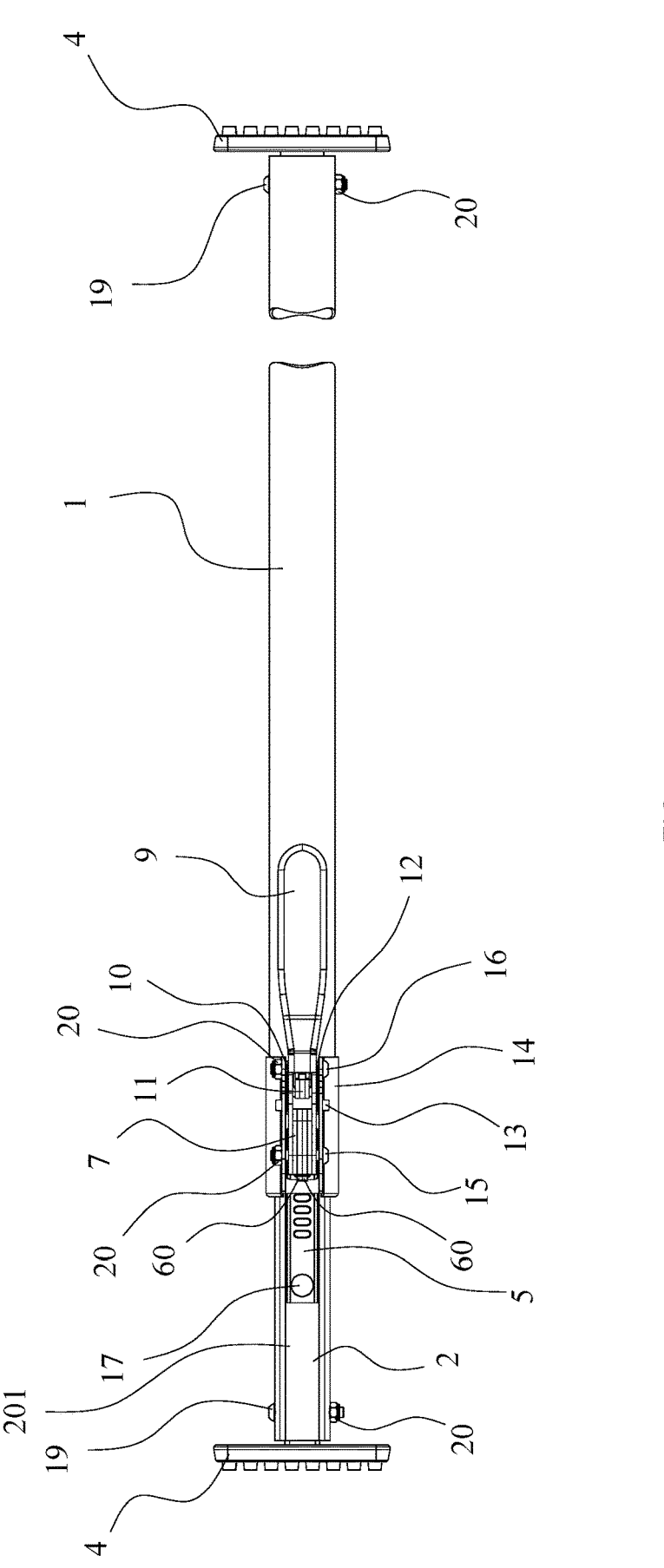
FIG. 4 is a top view of the extensible rod according to the embodiment of the present invention.

The reference numbers and the corresponding names of components are listed as below: 1—outer tube; 101—opening; 102—a lacking hole; 103—first end of the outer tube; 104—second end of the outer tube; 2—inner tube; 201—mounting plane; 202—first end of the inner tube; 203—second end of the inner tube; 3—supporting sheet; 4—pad; 5—rack; 501—hole; 502—mounting hole; 6—gear; 60—gear piece; 601—teeth; 7—backing plate;

8—fixation pin; 9—handle; 91—lateral piece; 10—lock pin; 11—lock catch; 111—lock hook; 112—slide guide slope; 12—elastic member; 13—limiting piece; 14—hollow seat; 141—sidewall portion; 142—inserting hole; 143—base portion; 15—handle bolt; 16—lock catch bolt; 17—long bolt; 18—short bolt; 19—bolt; 20—nut; and, 21—carriage wall.

DETAILED DESCRIPTION OF THE INVENTION

The present invention will be further described below in detail by embodiments with reference to the accompanying drawings.

As shown in FIGS. 1-4, the extensible rod with locking handle for goods comprises an inner tube 2, an outer tube 1, a rack 5, a hollow seat 14, an operating assembly and a lock catch assembly.

The inner tube 2 and the outer tube 1 are matched in shape to telescopically connected to each other, and the outer tube 1 is sleeved outside the inner tube 2, the section of the tube can be circular, or be quadrate, or be irregular; in this embodiment the outer tube 1 is a circular tube, the inner tube 2 is a D-shaped tube with a D-shaped cross-section forming a mounting plane 201 for the rack 5; a first end of the inner tube is connected to a supporting sheet 3 through a connection between a bolt 19 and a nut 20, the supporting sheet 3 is wrapped with a pad 4, the pad 4 is generally made of a soft material, so that a carriage surface in contact with the extensible rod with locking handle for goods can be protected from scratch, the friction between the extensible rod with locking handle for goods and the carriage surface is also increased, and the risk of falling off of the extensible rod with locking handle for goods is reduced; the second end 203 of the inner tube 2 is inserted into the outer tube 1, and is limited inside the outer tube 1 through a limiting mechanism between the second end 203 of the inner tube 2 and the outer tube 1, and will not be pulled out of the outer tube 1; the hollow seat 14 disposed on the first end 103 of outer tube 1 is used for mounting the operating assembly and the lock catch assembly, the first end 103 of outer tube 1 has an opening 101 and a lacking hole 102 on a periphery of the outer tube 1, the gear 6 disposed on the handle 9 passes through the opening 101 to engage with the rack 5 on the inner tube 2, the lacking hole 102 for receiving a limiting piece 13 is used for fixing the hollow seat 14; a second end 104 of the outer tube 1 is connected to the supporting sheet 3 with the soft pad 4 wrapped outside.

The hollow seat 14 has a base portion 143 with a C-shaped cross section for receiving the outer tube 1, and two sidewall portions 141 extending upward from two top edges of the base portion 143, the base portion 143 is a C-shaped tube being sleeved outside the first end 103 of the outer tube 1, the two sidewall portions 141 is parallel to each other vertically, and an accommodating space for the handle 9, the gear 6 and the lock catch 11 is defined between the two sidewall portions 141, the handle 9 is connected to the two sidewall portions 141 through a second pivot member and the lock catch 11 is connected to the two sidewall portions 141 through a first pivot member, therefore both of the handle 9 and the lock catch 11 are able to rotating around the pivot member; the first pivot member and the second pivot member may be bolts, pin shafts, rivets, etc., but the bolts shown in the accompanying drawings of this embodiment are preferred, for example, a handle bolt 15 and a lock catch bolt 16 as shown, both of them are equipped with nuts 20; the hollow seat 14 has two inserting holes 142 for receiving two ends of the limiting piece 13 to fix the outer tube 1.

During assembling, the limiting plate 13 is inserted into the limiting hole 102 and fixed to the inserting hole 142 on the hollow seat 14. This limiting plate 13 limits and fixes the hollow seat 14 and the outer tube 1, and can bear the axial pressure in the extensible rod with locking handle for goods generated during the operation of the outer tube 1.

The operating assembly comprises a handle 9 and a gear 6, the handle 9 has a front end and a rear end, the front end of the handle 9 has two opposite lateral pieces 91 distributed at regular intervals, the gear 6 is centrally arranged between the two lateral pieces 91, each lateral piece 91 and the gear 6 has a backing plate 7, the gear 6 and the backing plate 7 may be manufactured into an integral gear, but splicing is preferred to facilitate stamping. As shown in FIG. 1, the gear is formed by splicing two stamped gear pieces 60 and the backing plate 7 is arranged on each lateral piece 91, the gear piece 60 is not a complete circumference but has a plurality of teeth 601 stamped on a head of each gear piece 60 and the teeth are not standard involute teeth; heads and tails of the gear pieces 60 and the backing plates 7 have a plurality of holes for allowing the handle bolt 15 and the fixation pin 8 to pass through, the tails of the gear pieces 60 and the backing plates 7 has one or more holes for one or more fixation pins 8 to pass through to form an integral with the handle 9; the handle 9 is connected to the hollow seat 14 through the handle bolt 15, a lock pin 10 is further mounted in the middle of the handle 9, and the lock pin 10 is connected to the two lateral plates 91.

The lock catch assembly comprising a lock catch 11 is capable of locking or unlocking the handle 9 and is arranged between the two sidewall portions 141 of the hollow seat 14 through a lock catch bolt 16, the torsion spring 12 arranged inside the two sidewall portions 141 keeps the lock catch 11 in a vertical state; by pressing a top of the lock catch 11, the lock catch 11 can rotate counterclockwise about the lock catch bolt 16. The clastic member 12 is a twin-torsional spring having two ends, two ends of which are arranged on two sides of the lock catch 11 and limits the axial movement of the lock catch 11 along the lock catch bolt 16, thereby ensuring that the lock catch 11 is located in the middle of the two sidewall portions 141 of the hollow seat 14 and urges the lock catch 11 towards the locked state; the lock catch 11 has a lock hook 111 and a slide guide slope 112. During operation, a lock pin 10 locks the lock catch 11, the handle 9 is in a locked state and is unable to rotate, the lock pin 10 mounted on the handle 9 capable of locking or unlocking the lock hook 111, when the lock pin 10 locks the lock hook 111, the handle 9 is in a locked state and is unable to rotate, when the lock pin 10 unlocks the lock hook 111, the handle 9 is in an unlocked state and is able to rotate. By arranging the lock catch 11 centrally, the stress direction can be in the same plane as the axis of the stop lever, so that the stress is uniform and the strength is improved. In addition, since the handle 9 and the hollow seat 14 are arranged on two sides of the lock catch 11 for protection, the release caused by touching by mistake can be avoided, and the safety in use can be improved.

Figure 8:
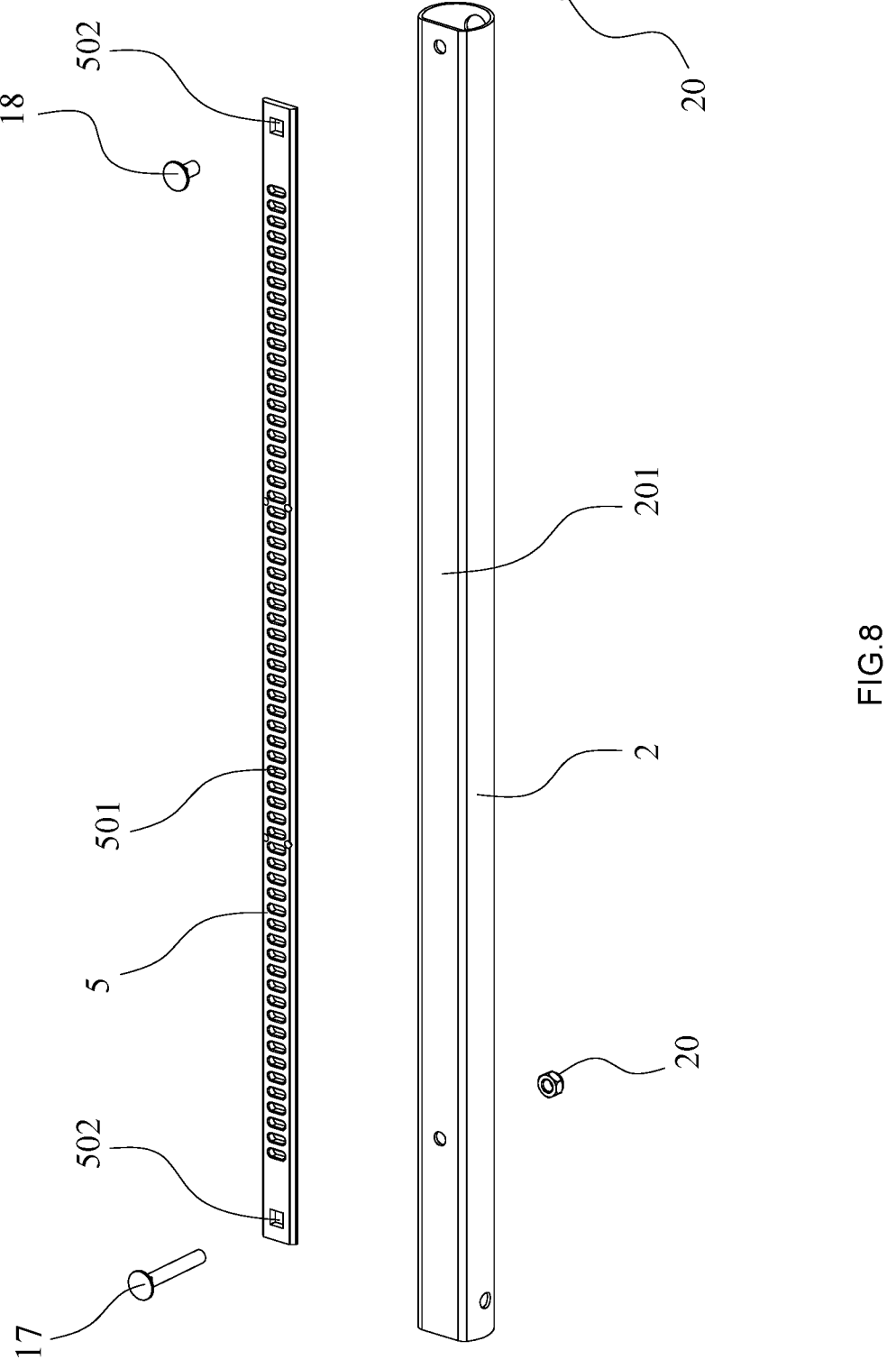
FIG. 8 is an exploded view of a rack and an inner tube according to the embodiment of the present invention.

As shown in FIG. 8, the rack 5 is a long strip-shaped stamped part without involute tooth profile traditionally, the rack 5 has a plurality of holes 501 distributed at regular intervals along a length of the rack 5 to engage with the teeth 601; each end of the rack 5 has a mounting hole 502 for receiving the fastener, so that two ends of the rack 5 are connected to the mounting plate 201 of the inner tube 2 through a first fastener and a second fastener, respectively. The first fastener and the second fastener may be bolts, pin shafts, rivets, etc. The mounting holes 502 may be circular or square, preferably square holes in this embodiment; and, the first fastener and the second fastener are preferably a long bot 17 and a short bolt 18, preferably square neck bolts.

Preferably, the inner tube 2 of the present invention is a D-shaped tube with a mounting plate 201, so the rack 5 preferably has a planar section and its bottom surface is fitted with the mounting plate 201. Of course, the rack 5 and the inner tube 2 of the present invention are not limited to those described in this embodiment. It is also possible that the inner tube 2 is a circular tube with no mounting plane 201, so that the rack 5 correspondingly has an arc-shaped section.

The inner tube 2 with the rack 5 is inserted into in the outer tube 1, and the head of the short bolt 18 is higher than a surface of the rack 5. When the inner tube 2 is pulled out to the left, i.e., in a direction of the first end 202 of the inner tube 2 away from the first end 103 of the outer tube 1, the head of the short bolt 18 will resist against the limiting plate 13 and cannot be pulled out. That is, the short bolt 18 and the limiting plate 13 form a limiting mechanism between the inner and outer tubes 1, 2, so that the second end 203 of the inner tube 2 located inside the first end 103 of the outer tube 1 and the inner tube being 2 telescopically connected to the outer tube 1.

Figure 9:
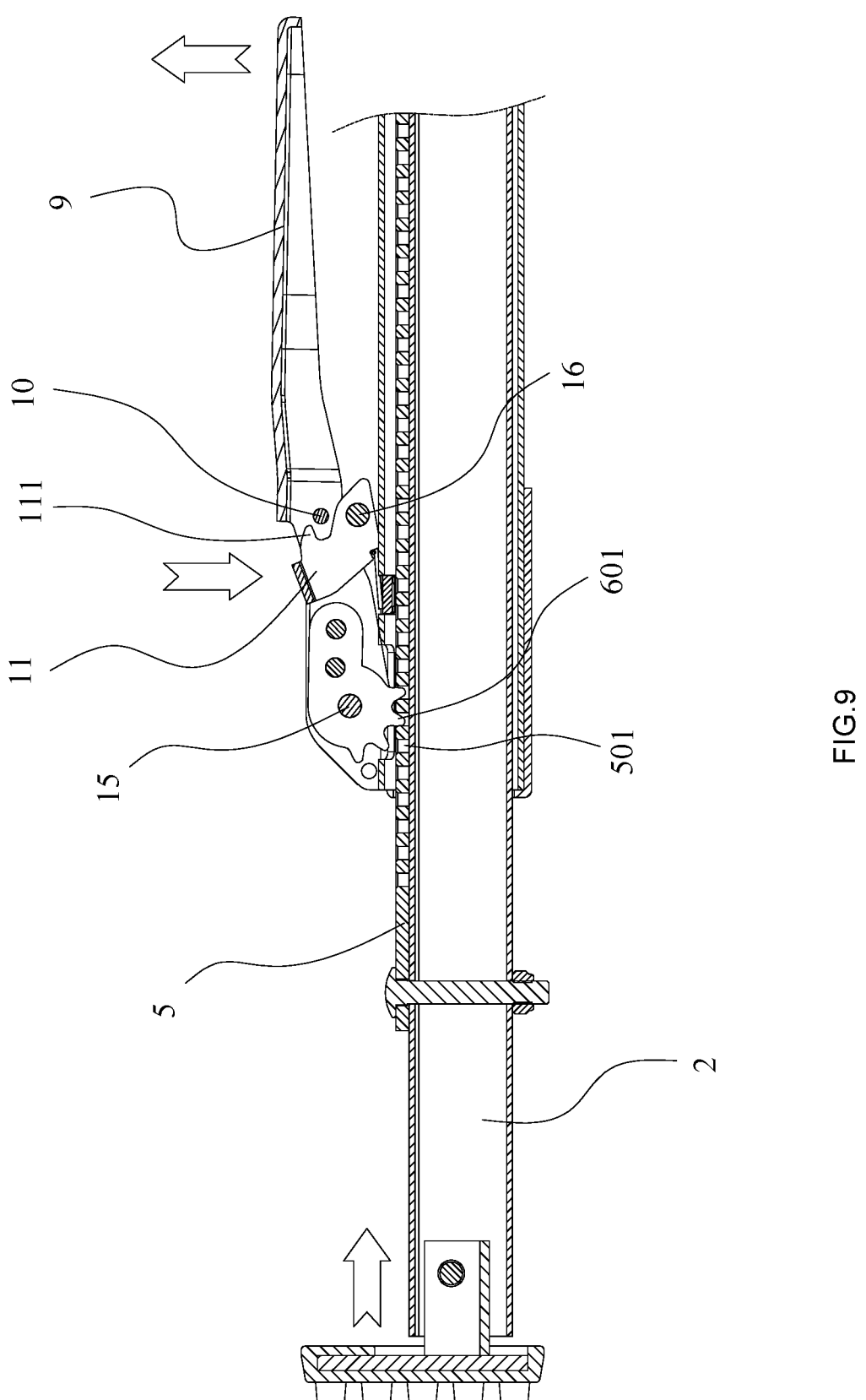
FIG. 9 is a sectional view of an unlocking (release) operation of the extensible rod according to the embodiment of the present invention.
Figure 10:
FIG. 10 is a sectional view of the extensible rod in an unlock (release) state according to the embodiment of the present invention.
Figure 11:
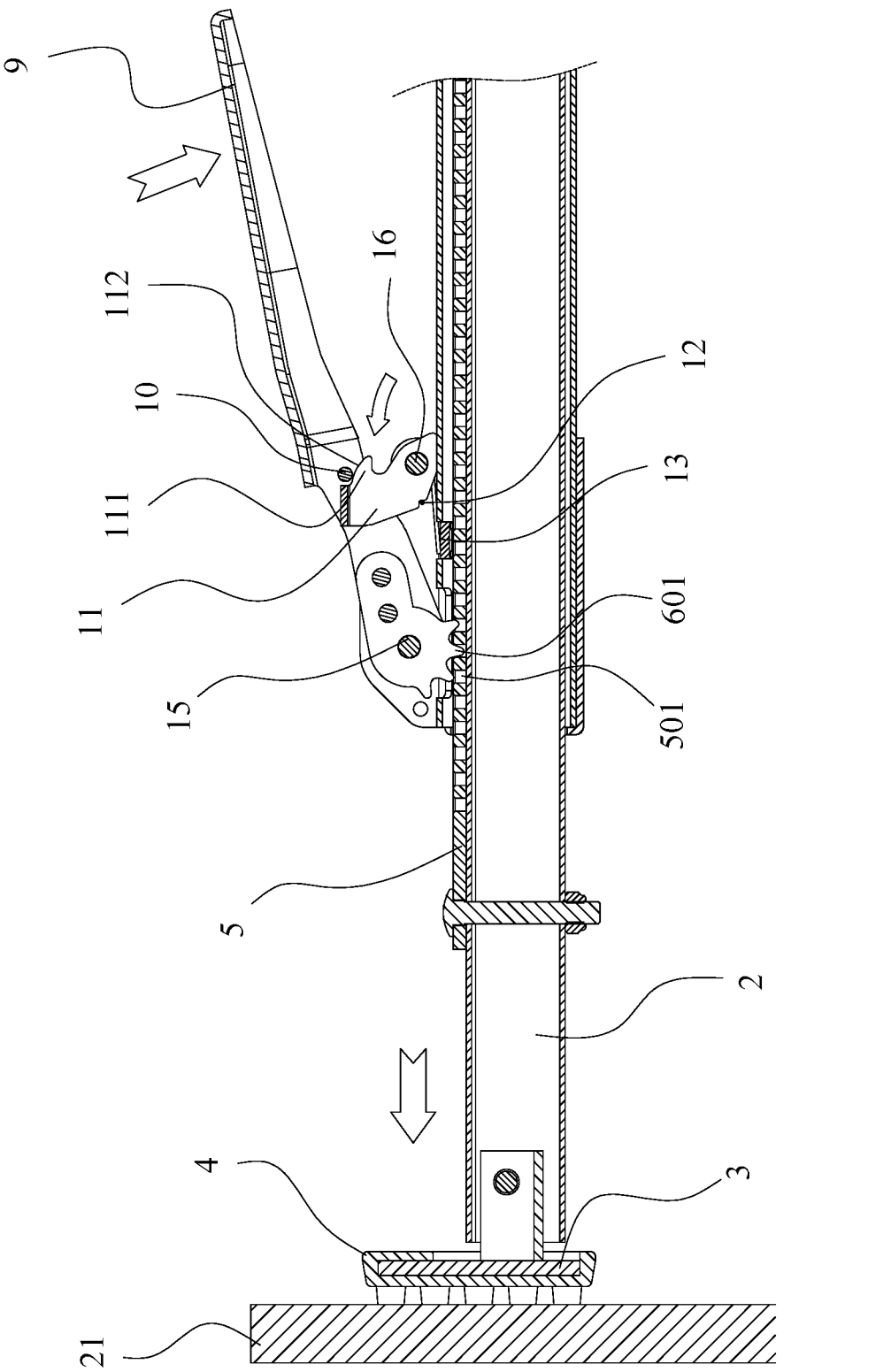
FIG. 11 is a sectional view of a locking operation of the extensible rod according to the embodiment of the present invention.

With reference to FIGS. 9-11, the dynamic process of using the extensible rod with locking handle for goods of the present invention will be described below.

As shown FIG. 9, when in use, the lock catch 11 is pressed down first, the lock catch 11 rotates counterclockwise about the lock catch bolt 16, and the lock hook 111 is detached from the lock pin 10. At this time, the handle 9 can rotate counterclockwise about the handle bolt 15 and drive the gear 6 to rotate synchronously. The teeth 601 on the gear 6 is inserted into the holes 501 on the rack 5 to mesh with the holes 501, thus urging the rack 5 to drive the inner tube 2 to axially move to the right.

As shown in FIG. 10, when the handle 9 is opened completely, the teeth 601 on the gear 6 are detached from the holes 501 on the rack 5. At this time, the inner tube 2 and the outer tube 1 can axially move left or right relative to each other, thus adjusting the total length of the extensible rod to an appropriate length.

Figure 5:
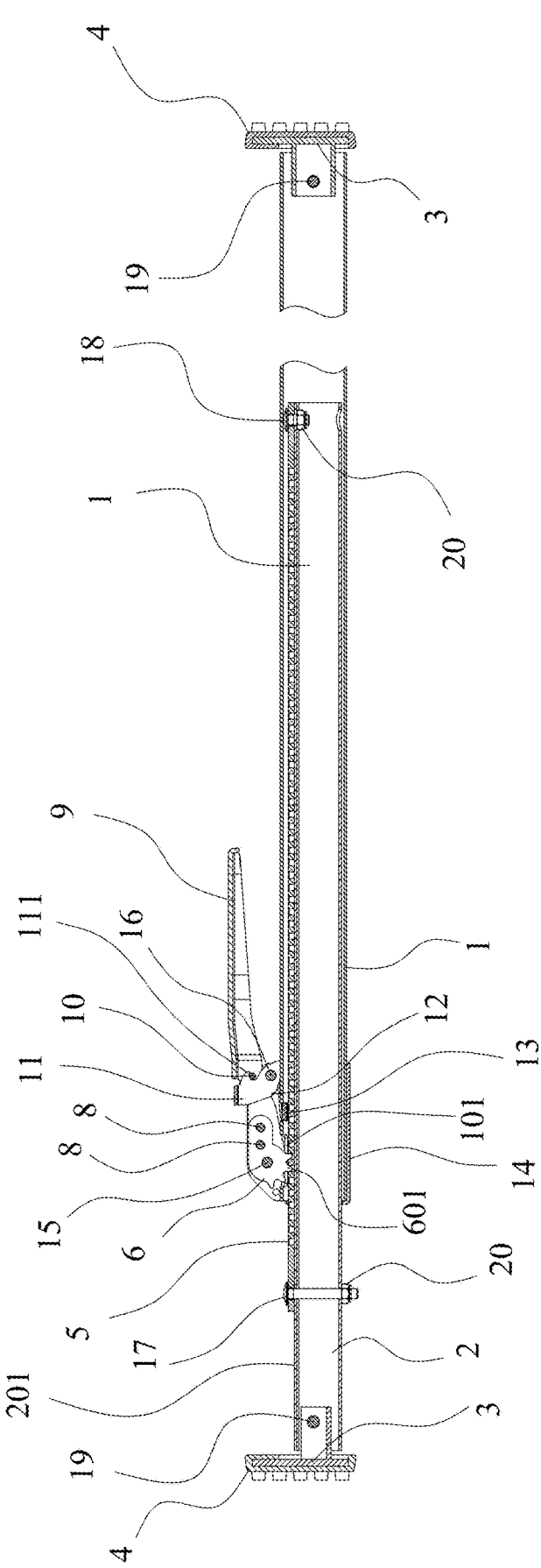
FIG. 5 is a sectional view of the extensible rod according to the embodiment of the present invention.
Figure 6:
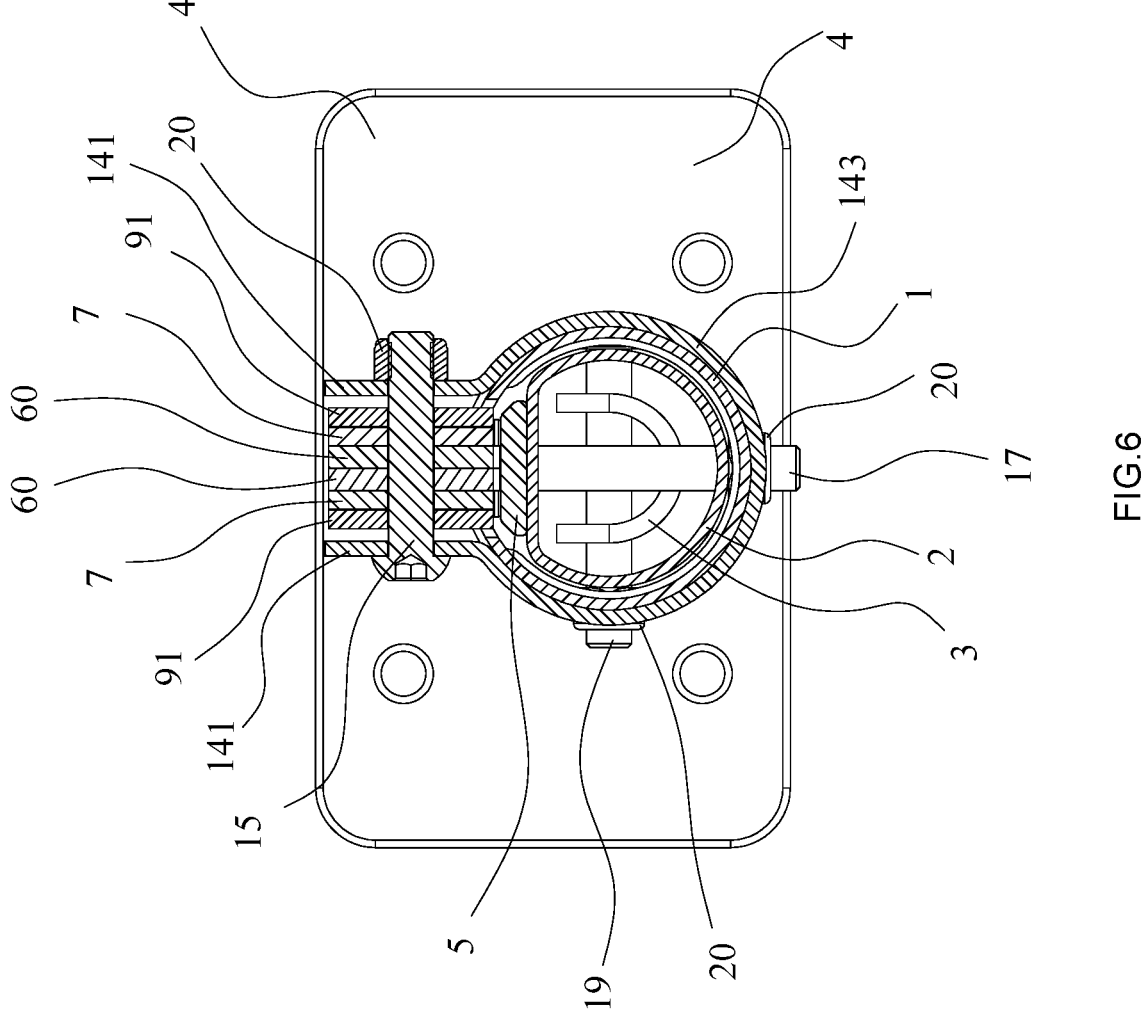
FIG. 6 is a sectional view showing how a handle is arranged according to the embodiment of the present invention.
Figure 7:
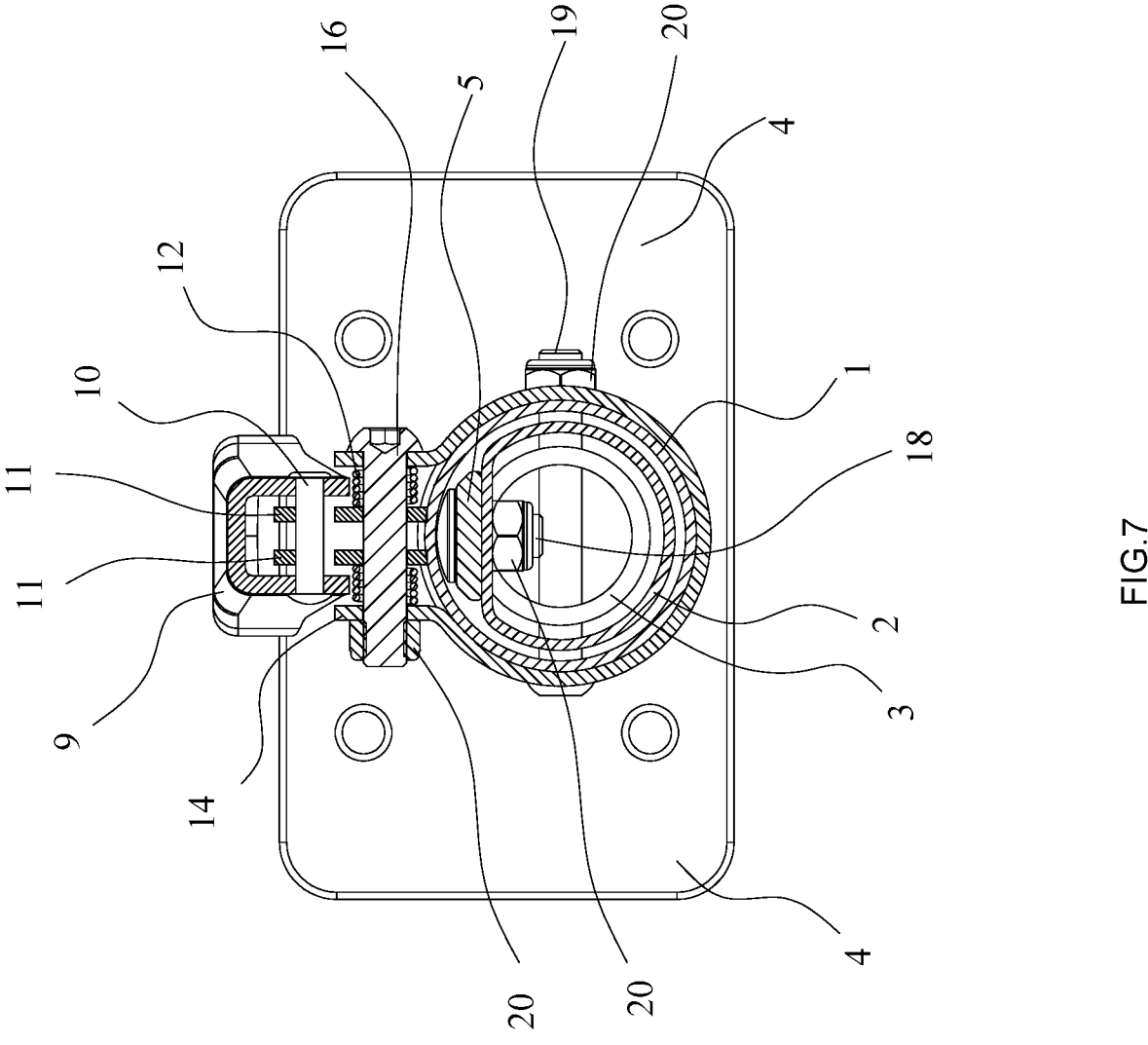
FIG. 7 is a sectional view of the handle when a lock catch is connected to the handle according to the embodiment of the present invention.

As shown in FIG. 11, after the length of the extensible rod is adjusted to a required length, the handle 9 is rotated clockwise to drive the teeth 601 to mesh with the holes 501 again, therefore the rack 5 and the inner tube 2 axially moves to the left, and the support sheets 3 wrapped with pads 4 are compressed on the carriage wall 21. In the process of pressing down the handle 9, the lock pin 10 comes into contact with the slide guide slope 112 in an upper portion of the lock hook 111, and the lock catch 11 is pushed to rotate counterclockwise. When the handle 9 is continuously pressed down, the lock pin 10 enters the lock hook 111, and the lock catch 11 is reset to lock the handle 9 under the action of the torsion springs 12, that is, in the state of FIG. 5. At this time, the extensible rod with locking handle for goods is completely braced and locked, and in the operating state. In the operating state, the teeth 601 on the gear 6 are located in the opening 101 of the outer tube 1 and mesh with the holes 501.

After use, the acts in FIGS. 9 and 10 are repeated to release the axial supporting force on the extensible rod with locking handle for goods, and the extensible rod with locking handle for goods is removed.

The invention claimed is:

1. An extensible rod with locking handle for goods, comprising:

an outer tube having a first end and a second end;

an inner tube having a first end and a second end, the second end of the inner tube located inside the first end of the outer tube and the inner tube being telescopically connected to the outer tube;

a rack disposed on the inner tube;

a hollow seat disposed on the first end of outer tube;

an operating assembly disposed on the seat for adjusting extension length of the inner tube; and a lock catch assembly;

wherein, the operating assembly comprises a rotatable handle and a gear with a plurality of teeth connected to the handle, the first end of the outer tube has an opening on a top surface of the outer tube, the teeth pass through the opening to engage with the rack on the inner tube, so that the handle and the gear are capable of driving the inner tube to extend out from or retract into the outer tube;

the lock catch assembly comprises a lock catch affixed to the hollow seat through a first pivot member, a lock pin mounted on the handle capable of locking or unlocking the lock catch, and an elastic member;

the lock catch assembly is capable of locking or unlocking the handle, and when the lock catch assembly locks the handle, the gear is engaged with the rack;

when the lock pin locks the lock catch, the handle is in a locked state and is unable to rotate, when the lock pin unlocks the lock catch, the handle is in an unlocked state and is able to rotate;

the elastic member urges the lock catch towards the locked state.

2. The extensible rod with locking handle for goods of claim 1, wherein the rack is a long strip-shaped stamped part, and the rack has a plurality of holes distributed at regular intervals along a length of the rack.

3. The extensible rod with locking handle for goods of claim 1, wherein the gear is composed of one or more gear pieces, and each gear piece is a stamped part with the plurality of teeth stamped on a head of each gear piece.

4. The extensible rod with locking handle for goods of claim 1, wherein the inner tube has a mounting plane for mounting the rack, the rack has two ends which are connected to the mounting plane.

5. The extensible rod with locking handle for goods of claim 1, wherein the hollow seat has a base portion with a C-shaped cross section for receiving the outer tube, and two sidewall portions extending upward from two top edges of the base portion, the handle is connected to the two sidewall portions through a second pivot member.

6. The extensible rod with locking handle for goods of claim 1, wherein the hollow seat is connected to the first end of the outer tube through a limiting piece inserted through the hollow seat and the outer tube;

and the first end of the outer tube has a lacking hole for receiving the limiting piece on the periphery of the outer tube, correspondingly, the hollow seat has two inserting holes for receiving two ends of the limiting piece.

7. The extensible rod with locking handle for goods of claim 6, wherein two ends of the rack are mounted on the mounting plane of the inner tube through a first fastener and a second fastener, respectively, and the head of the second fastener is higher than a surface of the rack so as to resist against the limiting piece;

the second fastener and the limiting piece together form a limiting mechanism between the outer tube and the inner tube, so as to prevent the second end of the inner tube from being pulled out of the first end of the outer tube.

8. The extensible rod with locking handle for goods of claim 1, wherein the handle has a front end and a rear end, the front end of the handle has two opposite lateral pieces, the gear is centrally arranged between the two lateral pieces.

9. The extensible rod with locking handle for goods of claim 4, wherein the outer tube is a circular tube, the inner tube is a D-shaped tube forming the mounting plane for the rack.

* * * * *